United States Patent [19]

Carter et al.

[11] 3,928,857

[45] Dec. 23, 1975

[54] INSTRUCTION FETCH APPARATUS WITH COMBINED LOOK-AHEAD AND LOOK-BEHIND CAPABILITY

[75] Inventors: Richard S. Carter; Spurgeon G. Hogan, Jr., both of Poughkeepsie; Wan L. Leung, Hyde Park; Bruce L. McGilvray, Pleasant Valley; Robert H. Werner, Wappingers Falls, all of N.Y.

[73] Assignee: International Business Machines Corporation, Armonk, N.Y.

[22] Filed: Aug. 30, 1973

[21] Appl. No.: 392,900

[52] U.S. Cl. .......... 340/172.5

[51] Int. Cl.² .......... G06F 9/06

[58] Field of Search .......... 340/172.5; 445/1

[56] References Cited

UNITED STATES PATENTS

| | | | |
|---|---|---|---|
| 3,156,897 | 11/1964 | Bahnsen et al. | 340/172.5 |
| 3,569,938 | 3/1971 | Eden et al. | 340/172.5 |
| 3,670,309 | 6/1972 | Amdahl et al. | 340/172.5 |
| 3,693,165 | 9/1972 | Reiley et al. | 340/172.5 |
| 3,778,776 | 12/1973 | Hakozaki | 340/172.5 |

*Primary Examiner*—Harvey E. Springborn
*Attorney, Agent, or Firm*—Edward S. Gershuny

[57] ABSTRACT

Apparatus for fetching instructions to an instruction register of a central processing unit, including instruction buffers for storing instructions prior to their execution in the CPU (look-ahead) and apparatus for storing instructions which have been executed in the CPU (look-behind) in anticipation of their further use in, for example, programming loops. The look-behind apparatus comprises a multi-word buffer with its associated data register. The buffer data register, in addition to its function as part of the look-behind apparatus, also provides an additional level of look-ahead.

4 Claims, 5 Drawing Figures

INSTRUCTION FETCH APPARATUS WITH COMBINED LOOK-AHEAD AND LOOK-BEHIND CAPABILITY

BACKGROUND OF THE INVENTION

This invention relates to instruction fetching in electronic data processing systems. More particularly, the invention relates to improved apparatus for reducing contention between attempts to access operands and attempts to access instructions from the system memory.

A substantial number of all computers built in recent years perform many different operations in parallel. In a typical system, while one or more instructions are being executed, one or more other instructions will be fetched from storage for decoding (or some amount of predecoding), the objective being to keep each portion of the system running as nearly as possible at full capacity. One problem that arises in such a system is that it will often be impossible to fetch an instruction from the system memory because the memory is already occupied (as a result of the simultaneous execution of another instruction) by an attempt to read or write an operand. This type of interference is known as "memory contention" and can substantially degrade system performance.

One method which is used in the prior art to alleviate the contention problem is the provision of one or more instruction buffers into which instructions can be prefetched and temporarily stored prior to their transfer to the CPU. Whenever one or more instruction buffers are empty, and the system memory is not otherwise occupied, instructions will be prefetched into the buffers. Such apparatus is commonly referred to as "look-ahead buffers".

Another prior art approach to the problem is to store into a multi-word instruction buffer those instructions which have recently been executed by the CPU. Since a substantial amount of computer time is spent in programming loops (that is, a certain sequence of instruction is executed many times before another sequence is begun), such apparatus (commonly referred to as a "look-behind buffer") will reduce memory contention by trapping programming loops and reducing the number of times that instructions must be fetched from the system storage.

Yet another known way to alleviate the contention problem is to utilize very high-speed memories (usually, primarily because of their expense, as relatively small buffers to a lower-speed memory). If data (instructions and operands) can be accessed quickly enough, there will be less degradation of performance due to contention. One drawback to this solution is that high-speed memories are very expensive. Another drawback is that a high-speed memory will often require additional special high-speed circuitry (which is also expensive) to access it.

Still another prior art attempt to solve the contention problem utilizes separate memories for storing instructions and operands. Two primary drawbacks to this solution are: (1) the total memory size has to be increased (and thus, again, made more expensive) in order to allow for a reasonable maximum number of instructions and a reasonable maximum number of operands; and (2) contention will still be present to at least some degree because "instructions" are often manipulated by other instructions (that is, utilized as if they were operands) and thus contention will still be present.

SUMMARY OF THE INVENTION

In accordance with a preferred embodiment of this invention, a look-behind instruction buffer is provided in a data processing system which preferably already includes one or more look-ahead instruction buffers. As instructions are read from the system storage, they are stored in a location in the instruction buffer that is defined by certain predetermined ones (preferably the low-order) of the bits which define the system storage address from which the instruction was fetched. When the instruction is stored in the instruction buffer, an entry is also made into a buffer index to define the complete address from which the instruction was fetched. When an instruction fetch is initiated, an instruction is read from the instruction buffer (I-buffer). Simultaneously, the index entry that is associated with the I-buffer location from which the instruction was read is also accessed. The index entry is compared against the address of the desired instruction in order to determine whether or not the instruction that was read from the buffer is appropriate. An equal comparison will result in accessing the instruction read from the buffer without the need for a reference to the system storage. If the instruction read from the buffer is not the correct one (signified by an unequal comparison), the appropriate instruction will be fetched from system storage, it will be stored into the I-buffer, and an appropriate entry will be made into the buffer index. In the preferred embodiment of this invention, the I-buffer performs the dual function of being part of the mechanism by which instructions are stored in the look-behind buffer and of also furnishing an additional level of look-ahead buffering.

The primary advantage of this invention is that its incorporation into a data processing system will lessen the contention problem discussed above. This will result in improved performance in most data processing systems which perform parallel operations and could, in some situations, serve to reduce the overall cost of the system by lessening the need for high-speed memories and their associated circuitry.

Another significant advantage of the invention is that it is quite inexpensive to implement, particularly when its cost is compared to the potential performance improvements.

Still another advantageous feature of the invention is that it can be implemented very easily and will have only a negligible effect upon the performance and implementation of practically all of the other portions of the overall system. This feature leads to the further advantage that a possible malfunction in the hardware added by this invention will generally not cause a system failure but will simply cause the system to perform just as it would have if the invention had not been added.

The above and other features and advantages of this invention will be apparent from the following description of a preferred embodiment thereof as illustrated in the accompanying drawings.

DETAILED DESCRIPTION

The description contained herein is, for the most art, restricted to that information which may be necssary in order for one to understand the claimed inention. For additional details of an environmental ata processing system, reference is made to "Sysəm/370 Model 158 Maintenance/Diagrams Manual", Form No. SY22-6912-1) published Aug. 1, 1973. ıtroductory information that describes data formats, ıstruction formats, status switching and program interıpts is in "IBM Systems/360 Principles of Operation" Form No. GA22-6821) published 1964 and "IBM ystem/370 Principles of Operation" (Form No. iA22-7000) published 1970. Other related manuals to 'hich reference may be made for various details releant to the implementation of the environmental data rocessing system are: "IBM Theory of Operation, 'omponent Circuits, SLT, SLD, ASLT, MST" (Form lo. SY22-2798) published 1970; "IBM Theory Of ›peration, Power Supplies, SLT, SLD, ASLT, MST" Form No. SY22-2799) published 1968; and "IBM 'heory Of Operation, Monolithic System Technology, ackaging Tools, Wiring Change Procedures" (Form lo. SY22-6739) published 1969. All of the above manals have been published by International Business lachines Corporation and all are incorporated herein y this reference.

The following portion of this specification is divided ıto five main sections. The first section, SYSTEM ›VERVIEW, presents a general description of an elec·onic data processing system which embodies this ıvention. The second section, FETCH OPERATION, resents a general description of the manner in which ata (instructions and/or operands) are fetched. The ıird section, INSTRUCTION FETCH FUNCTIONAL 'NITS, presents a general description of the functional nits of the data processing system which are involved ı instruction-fetching. The fourth section, SCU I-UFFER AND I-BUFFER INDEX (IBIX), contains a ıore detailed description of a preferred implementaon of the instruction buffering apparatus which is the eart of the invention claimed herein. The fifth section, ;ENERAL DESCRIPTION OF THE INVENTION, ontains a more generalized description of the invenon as it might be implemented on any given data rocessing system.

SYSTEM OVERVIEW

Figure 1:
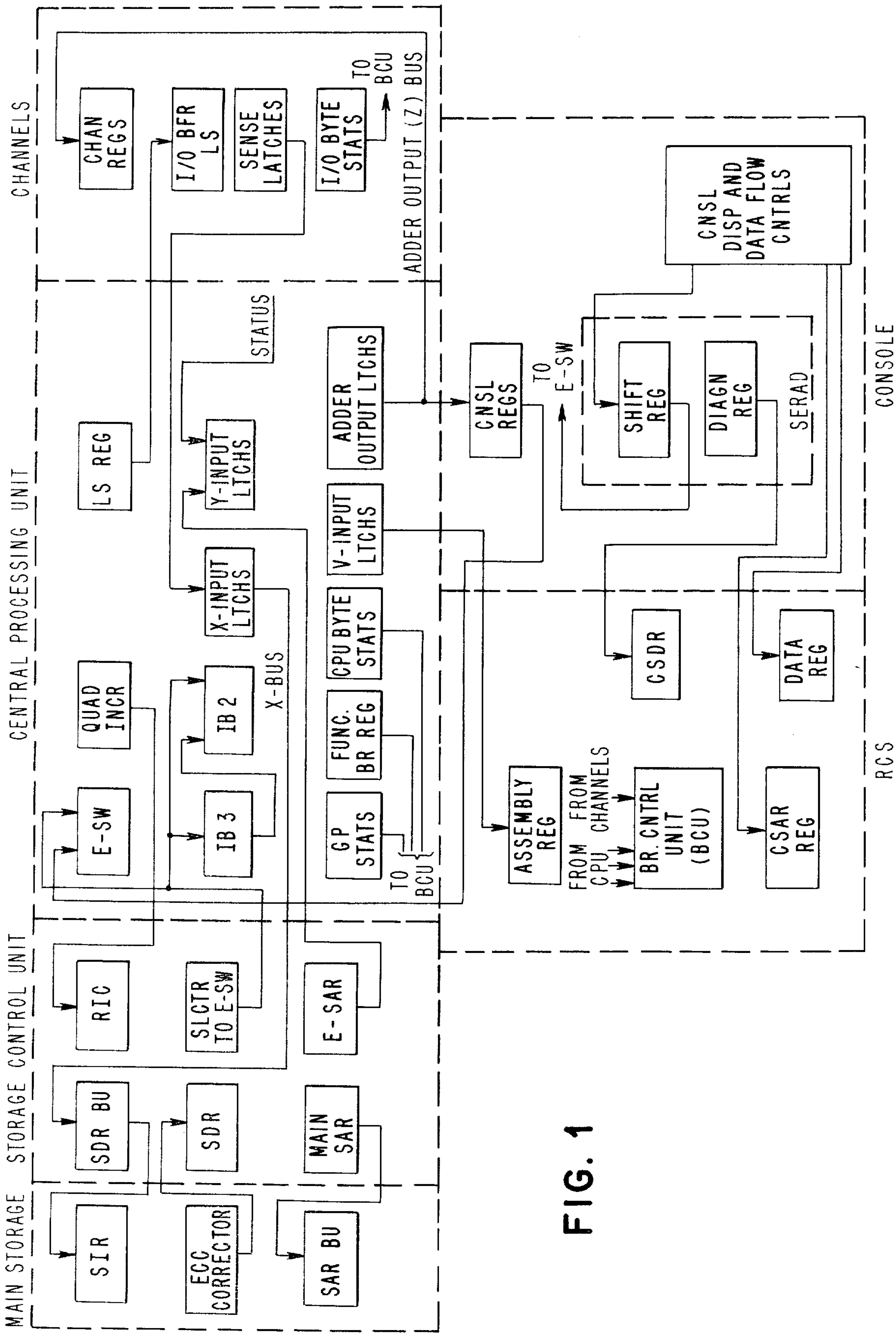
FIG. 1 shows, in block diagram form, various portions of a typical electronic data processing system which may advantageously utilize this invention.

As is shown in FIG. 1, a preferred embodiment of an lectronic data processing system which includes this ıvention comprises six main sections: Main Storage; torage Control Unit; Reloadable Control Storage; 'entral Processing Unit; I/O Channels; and a Console.

In FIG. 1, each of the main portions of the system is nclosed by broken lines. Also, for each portion of the ,stem, the only elements shown are selected ones which are utilized in connecting the six main portions together. Additional details concerning all of the portions of the environmental data processing system may be found in the manuals incorporated above.

MAIN STORAGE

The main storage area of the system consists of monolithic main storage for system data, and circuits that provide data paths and controls for data input and output, error correction codes (ECC) for automatic error correction, and a means of addressing main storage.

Main storage is in two sections, main storage low and main storage high. Only one section participates in a store operation when the data to be stored is within a doubleword boundary. Both sections of main storage participate in a storage operation when the data to be stored crosses a doubleword boundary.

During store operations, data from the storage control unit (SCU) enters the storage input register (SIR), a doubleword at a time. When the data to be stored crosses a doubleword boundary, then two doublewords are set into SIR, one at a time. From the SIR, a doubleword of data is routed through either or both of two final assemblers and into storage. In the final assembler, ECC bits are assigned to accompany the data into storage.

During fetch operations, both sections of main storage participate to provide a quadword (16 bytes) of data; a doubleword is set into each storage output register (SOR). The data in each SOR is routed to the SCU during one of two consecutive time slots; the SOR gated first is determined by the storage address supplied by the CPU when the fetch is initiated.

Data enroute from a SOR to the SCU enters an ECC generator and passes through the ECC corrector. The ECC generator provides new ECC bits that are compared with the ECC bits that accompany the data from storage to detect single-or double-bit errors. The ECC decoder detects any unequal comparison and provides a bit-inerror (BIER) signal to the ECC corrector, where the single-bit errors are automatically corrected. Double-bit errors are not corrected, but an error signal is sent to the SCU.

Storage Control Unit (SCU)

The SCU provides the data paths and controls to: (1) transfer data between the CPU and main storage, (2) provide rapid access to frequently used data in the high-speed buffer without accessing main storage, (3) translate virtual addresses to real addresses in the dynamic address translation (DAT) facility, (4) execute special main storage (SPMS) and extended feature (EXFEAT) operations, and (5) detect and signal storage protection (SP) violations.

During a CPU or channel store operation, the data flow route is from the CPU through the SCU and into main storage. Up to four words are transferred from the CPU area to the SCU on the CPU X-bus and set into the storage data register backup (SDRBU), one word at a time, prior to initiating the store operation. During the store operation, a doubleword at a time is transferred to main storage.

During a CPU or channel fetch operation, the data flow route is from main storage through the SCU into the CPU. Two doublewords, one at a time, are transferred from main storage into the SDR in the SCU. Then, one word at a time is transferred to an instruction buffer IB2 or IB3 in the CPU I-fetch area, or into the CPU through the E-switch.

The high-speed data buffer is an 8,000-byte monolithic storage device used to store frequently used instructions and operand data. During each CPU fetch from main storage, the entire quadword is stored in the buffer while the addressed word is routed to the CPU. The access time for most of the subsequent CPU fetches is reduced because the addressed data resides in the buffer. (Channel data does not enter the buffer.)

The DAT facility (which includes the segment table origin (STO) register, the segment table entry (STE) register, the table entry register (TER), the DAT adder, and the translation lookaside buffer (TLB)) translates virtual addresses to real addresses when the system uses virtual addresses. The STO register, STE register, TER, and the DAT adder perform the address translations. The TLB functions similarly to the high-speed buffer; it retains the most recently translated addresses, thus reducing the number of main storage fetches required for the translation.

Also contained within the SCU, and of particular importance with respect to the instant invention, is an instruction buffer and its associated index. As will be described in more detail below, these units are utilized during instruction fetching to reduce interference between attempts to utilize the system storage for accessing instructions and operands.

Reloadable Control Storage (RCS)

The microprogram that controls system operations is stored in an **8*k***, 72-bit monolithic RCS. The microprogram is loaded into RCS from a console file disk during the initial microprogram load (IMPL) routine that follows system power on. Microprogram data from the console file is routed through the console control and a service adapter, SERAD, through the CPU E-switch, the C-register, the V-bus, and the assembly register into RCS.

After IMPL, RCS takes control of the system. Every CPU cycle thereafter, a 72-bit control word (microinstruction) is read out of RCS into the control storage data register (CSDR). IN CSDR, the bit structure of various defined fields (microorders) are decoded to control the system and to provide the RCS address of the next microinstruction.

For diagnostic purposes, microinstructions read from the console file may be routed through SERAD and set directly into the CSDR.

Central Processing Unit (CPU)

Execution of all instructions is initiated and terminated in the CPU, which is made up of the following areas: Instructionfetch (I-fetch); External switch (E-switch); Arithmetic; and Local storage (LS).

Fetch Area (Instruction Buffers, Instruction Counters, and Instruction Buffer Backup Registers) receives instructions fetched from main storage and examines them to determine the instruction type (RR, RX, SI, etc.) and operation code. The instruction type defines the operand locations; the operation code causes the microprogram in CS to branch to the routine required to execute the instruction.

E-Switch Area is the primary data entry path to the CPU from main storage and the console area. All operand and instruction-address data enters here.

Arithmetic Area performs all operand and address calculations. This area consists of the working registers (A, B, C and D), an adder, a mover, bit shifters, control counters, and the associated one-byte and four-byte data paths. The four-byte data paths are also shared by the channels when data is being transferred to or from main storage.

Local Storage Areas (CPU LS, I/O UCW LS) consist of high-speed monolithic storage devices integrated into the CPU circuits. The general purpose registers, floating point registers, control registers, and status-backup registers, together with an area for working storage, are assigned to local storage. The channel unit control words (UCWs) are in a separate section of local storage.

I/O Channels

Channel adapters, physically packaged in the CPU frame, provide the data and control interfaces to the channel control units; they share the CPU hardware and microprogram controls.

Each channel adapter provides a data and control interface that is compatible with the system channels, and has data handling capabilities to accommodate I/O device. The interface sequencing controls are part of the channel adapters.

In addition to the sequencing controls, the I/O LS buffer, channel buffer register, and bus-out latches make up the primary elements that transfer data to or from a channel I/O unit. The I/O LS buffer is identical with, but separate from, the CPU LS; it provides a 32-byte buffer storage area for each channel. The channel buffer registers and bus-out latches are one-byte momentary storage devices.

Data being transferred from main storage to an I/O device is loaded four bytes at a time into the I/O LS buffer from the CPU data path. Thereafter, one byte at a time is transferred from the I/O LS buffer through the channel buffer register and bus-out latches to the I/O bus-out lines. Similarly, data from the channel arrives one-byte at a time on the bus-in lines and passes through the channel buffer register into the I/O LS buffer. From the I/O LS buffer, the data goes to main storage four bytes at a time.

Console

The console contains the storage and logic circuits required to control the communication between the operator and the system, to perform maintenance functions, and to logout error conditions. The major elements of the console are:

Console Display Control Area

This contains a monolithic console storage and the controls and data paths necessary to interface with the CPU and the peripheral console elements. Console storage provides a log buffer area for logout data and an area where the console microprogram resides. The console microprogram controls the console operations and the data flow to and from the console display unit, keyboard, console files, SERAD, and the CPU. The system serializers provide the display and logout data from all areas of the system to the console display control area.

Video Display Unit and Light Pen

Any one of several frames of system data and control information can be displayed on the screen f the display unit. The console microprogram con-·ols the format and content of each frame dis-layed. The light pen can be touched to the ap-ropriate spot on the screen to: activate system con-·ols, set maintenance switches, change display frames, nd alter system data.

Keyboard

The keyboard supplements the video display nit; it can be used alone or in combination with the ght pen to manually activate system controls or to nter data.

Console Operation and Maintenance Registers

These provide a data path between the console ıd the CPU for console operation and maintenance ınctions. Data from the CPU Z-bus is set into either ;gister, depending on the function, four bytes at a me; then, via the serializers, into the console dis-ay control area. Data from the console display area set into either register, depending on the function, ıe byte at a time, then routed to the CPU E-switch bytes at a time.

Console Files

Two low-speed input/output files are used to enter ıta into the system and to record log-out informa-on. Both files accept flexible magnetic recording sks that are manually inserted. The data flow be-veen the files and console display control is serial, t-by-bit.

Console file 1 is used primarily to enter the console icroprogram and the system microprogram during 'stem IMPL, and to enter diagnostic data when per-ırming maintenance functions on the console.

Console file 2 is used primarily to enter diagnostic ıta when performing maintenance functions on the 'stem, and to record logout data during normal system peration.

Service Adapter (SERAD)

SERAD is used to route data from a console e to the CPU during IMPL or to the CSDR during agnostic testing. Data from the console file is ıuted through the console display control area ıd serially, bit-by-bit, into the shift register in ERAD. During system IMPL when RCS is being aded, data is routed from the shift register to the CPU ·switch one byte at a time. When running microdiag-ıstic tests read from the console file, data is routed ɔm the shift register into the diagnostic register and en into the CSDR.

FETCH OPERATION

The following is a very general description of the anner in which data is fetched from memory by the ıvironmental system illustrated in FIG. 1. Additional :tails of the apparatus which is used to accomplish tching, and its manner of operation, may be found in e manuals referred to above, most particularly in the anual first referred to.

For a fetch operation, the SCU transfers data to the switch or to the instruction buffers in the CPU. The ıta may come from main storage if the data is not in e buffer. The data always comes from main storage r an I/O request.

The three types of CPU fetch operations are: (1) fetch-data not in the buffer, a microorder fetch from main storage, and a nine-cycle operation; (2) fetch-data in buffer, a microorder fetch from the buffer if the data is located there, and also a two-cycle operation; (3) FIB-a hardware-originated request used to fill the SCU I-buffer or CPU IBs. The operation is two cycles if data is in the SCU buffer, or nine cycles if data is fetched from main storage.

I/O fetch operations are nine-cycle operations because data is always fetched from main storage. From one to four words are transferred. A more-than-two-word transfer requires that "Four-word Transfer" be active. "Backward" is active to reverse the normal sequence of words from low, even and odd, and high, even and odd, to high, odd and even, and low, odd and even.

CPU Fetch—Data Not In Buffer

During this operation, data is fetched from main storage because it is not available in the buffer, and is presented to the E-switch or IBs. The data-not-in-buffer operation requires nine cycles to obtain the data. The first data transfer causes holdoff cycles through cycle 7 when the first data word is available. The second data word is available the next cycle if there is a second data transfer microorder. The four words (quadword) of fetched data are also stored in the buffer. The following are the objectives of this operation:

Select SCU and establish type of operation.
Check for CPU or I/O mode.
Check TLB for translated address.
Translate address if not in TLB.
Check for invalid address and proper storage key.
Check for address in index.
When data is not in index, fetch from main storage.
Set buffer write latch in preparation for writing a quadword of data into the buffer and enabling "Advance" at the end of the operation.
Set holdoff latch in CPU with data transfer microorder.
Send Advance to CPU to signal that data is ready. (This causes holdoff cycles to end.)
Transfer two data words to E-switch or IBs.
Write quadword into buffer.
Activate "Read End Reset" and "End Reset" to end operation.

CPU Fetch—Data In Buffer

During this operation, data is fetched from the buffer and presented to the E-switch or to the IBs. The address is loaded on the SAR bus to the SCU. Then there is a memory select to the SCU and designation of the type of operation, followed by a data transfer from the SDR in SCU to the E-switch and subsequently to the CPU. A storage protect key is included with the address bits. The following are the objectives of this operation:

Select SCU and establish type of operation.
Check for CPU or I/O mode.
Check TLB for translated address.
Translate address if not in TLB.
Check for invalid address and proper storage key.
Check for address in index.
Select buffer if address is in index.

Gate buffer to read data out to E-switch or IBs.
Send Advance to CPU to signal that data is available.

Fill Instruction Buffer (FIB)

FIB is a hardware-oriented microorder which initiates a fetch operation that loads the SCU I-buffer and sometimes the CPU IBs. If a FIB is contained in a micro-instruction, then the FIB "takes" when two IBs are empty or when the SCU I-buffer does not contain the next doubleword of instruction after the last one in the IBs.

A FIB may take place under a store operation if the data is in the buffer. If data is not in the buffer during a store operation, the read hold select latch causes a new select at the end of the store operation, and the data is fetched from main storage. The following are the objectives of this operation when the data is in the buffer:

Select SCU and establish the type of operation.
Check TLB for translated address.
Translate address if not in TLB.
Check for invalid address and proper storage key.
Check to see if storage is busy doing store.
Do regular fetch if storage is not busy.
Fetch under store if storage is doing store.
Check for address in index (data is in).
Gate buffer to read data out to SCU I-buffer and IBs.
Send Advance to CPU to signal that data is available.

The following are the objectives of this operation when the data is not in the buffer:

Select SCU and establish type of operation.
Check TLB for translated address.
Translate address if not in TLB.
Check for invalid address and proper storage key.
Check for address in index (data is out).
Check to see if storage is busy doing store.
Set read hold latch if storage is busy doing store.
Activate select pulse with read hold select latch when storage is no longer busy.
Set buffer write latch in preparation for writing a quadword of data into the buffer, and for enabling Advance at the end of the operation.
Fetch data from main storage.
Send Advance to CPU.
Transfer two data words to E-switch.
Write a quadword of data into SCU I-buffer and SCU buffer.
Activate Read End Reset and End Reset to end operation.

INSTRUCTION FETCH FUNCTIONAL UNITS

The instruction fetch (I-fetch) operation is concerned with moving an instruction, which was originally contained in main storage, to the CPU for execution. The following is a general description of the functional units within the data processing system which are involved in the I-fetch operation. For additional details of a manner in which the various functional units can be implemented, and their manner of operation, reference is made to the manuals which were listed above, most particularly to the first-mentioned of said manuals.

The I-fetch section of the CPU fetches (from storage), holds, and partially decodes the stream of instructions. The I-fetch hardware is controlled by a combination of microprogram and hardware seqences. Both the storage control unit and the CPU are involved in I-fetch. The storage control unit contains a 64 word instruction buffer. CPU hardware consists of instruction buffers, instruction counters, I-fetch incrementer, quadword incrementer, CPU storage address register, length and displacement adder, I-fetch status latches, and general purpose status latches.

SCU Instruction Buffer

The SCU (see FIGS. 2A and 2B) contains a 64-word instruction buffer and an instruction buffer index (IBIX). When a FIB is issued, the address in real SAR is compared against the IBIX to see if the instruction has been written in the SCU I-buffer. When a no compare occurs or two CPU IBs are empty, a quadword is fetched from main storage and is written into the SCU I-buffer (if the instruction is in the data buffer, a doubleword is written into the I-buffer), and the addressed doubleword is loaded into IB3 and IB2. When a compare occurs, the FIB took latch is blocked, and no action is taken in the SCU.

When the instruction fetch threshold signal is on (referred to an "IFTN time"), an IBIX compare is performed again. When a compare occurs and two IBs are empty, the addressed doubleword in the SCU I-buffer is gated to IB3 and IB2.

CPU Instruction Buffers

IBs 2 and 3 accept one word each of instructions from storage. IBs 1 and 2 gate the fields of each instruction to the correct areas of the CPU according to the instruction format.

Op codes and instruction fields are decoded from IB1 (or in the case of an SS op, from IB1 and IB2). As each word of an instruction is completed in IB1, a new word moves from IB2 to IB1. When IB2 is empty, a new word from IB3 moves to fill IB2. When either IB2 and IB3 or IB2 and IB1 are empty, an instruction-fetch sequence obtains a doubleword of instructions from system storage. The sequence begins with a FIB microorder.

Instruction Counters

Two instruction counters (ICs) keep track of the addresses of the two instruction words in IB1 and IB2. When instruction words are moved in the IBs, the addresses are moved correspondingly in the ICs. As instructions are processed, a special circuit in IC1 keeps track of addresses until a FIB is issued. When FIB occurs, the contents of IC1 is sent to the incrementer, a value of 4 or 12 is added to the address, and the resulting address is sent to SAR to fetch the next sequential instruction (NSI) from the next sequential storage address.

An instruction counter backup register retains the address from IC1 in case it is needed for a retry.

I-fetch Incrementer

The I-fetch incrementer accepts bits 20–29 from IC1 and either passes them straight through or adds 4 or 12 to the value to provide an updated SAR address for the next FIB. It adds 4 to the value in IC1 to provide an updated address for IC2 when the SCU I-buffer is gated to IB3 and IB2.

When the incrementer adds to an address, it is possible to carry out of position 20 (incrementer over-flow). If this condition occurs, the next address must be generated (in the CPU main adder) under control of a microprogram routine. The address in IC1 enters the CPU main adder via the E-switch and the C-register.

[T]he address is corrected and the result goes to SAR via [t]he Z-bus.

Quadword Incrementer

The quadword incrementer points to the next dou[b]leword to be loaded into IB3 and IB2. The incre[m]enter accepts bits 21–28 from IC1 and adds 12 to the [v]alue to provide an updated address for the real in[s]truction counter (RIC). No address translation takes [p]lace because bits 21–28 are the displacement portion [o]f the virtual address. When a carryout of position 21 [o]ccurs (2k page crossed), RIC valid is reset to force a [f]etch from main storage.

CPU Storage Address Register

Each store or fetch address is placed in the CPU [s]torage address register (SAR) and gated to storage via [t]he SAR bus. (In EC mode and relocate, the addresses [i]n CPU SAR are virtual).

Addresses in IC1 and the incrementer have access to [t]he CPU data flow through the external switch for such [o]perations as store PSW (the instruction address forms [p]art of the stored PSW).

Length And Displacement Adder

The length and displacement adder adds the length [a]nd displacement fields of decimal-operation instruc[ti]ons. The result enters the CPU main adder on the [Y]-bus. In the main adder, the base-register contents [s]pecified by the instruction are added to the value from [th]e length and displacement adder to determine the [u]nits position of the decimal operand.

I-fetch Status Latches

Seven I-fetch status latches hold control and machine [st]atus information pertaining to I-fetch.

The I-fetch status backup latches retain bits 5, 6, and [4] in case they are needed for a retry. Positions 0–3 do [n]ot require a separate backup because their informa[ti]on would not be lost during entry.

General Purpose Stats

The GP stats registers are two-byte registers (early [a]nd late stats) that each retain eight bits of status infor[m]ation. The state of the bits in the GP stats registers [i]ndicates prior CPU conditions and provides decision [fu]nctions. The microprogram word being decoded de[te]rmines the functions of the bits in the GP stats regis[te]rs. Status bits may be set into the registers eight bits [a]t a time; individual bits may be altered to reflect CPU [c]onditions, by certain special signals to the GP stats or [b]y emit field bits.

SCU I-buffer and I-buffer index (IBIX)

Figure 2A:
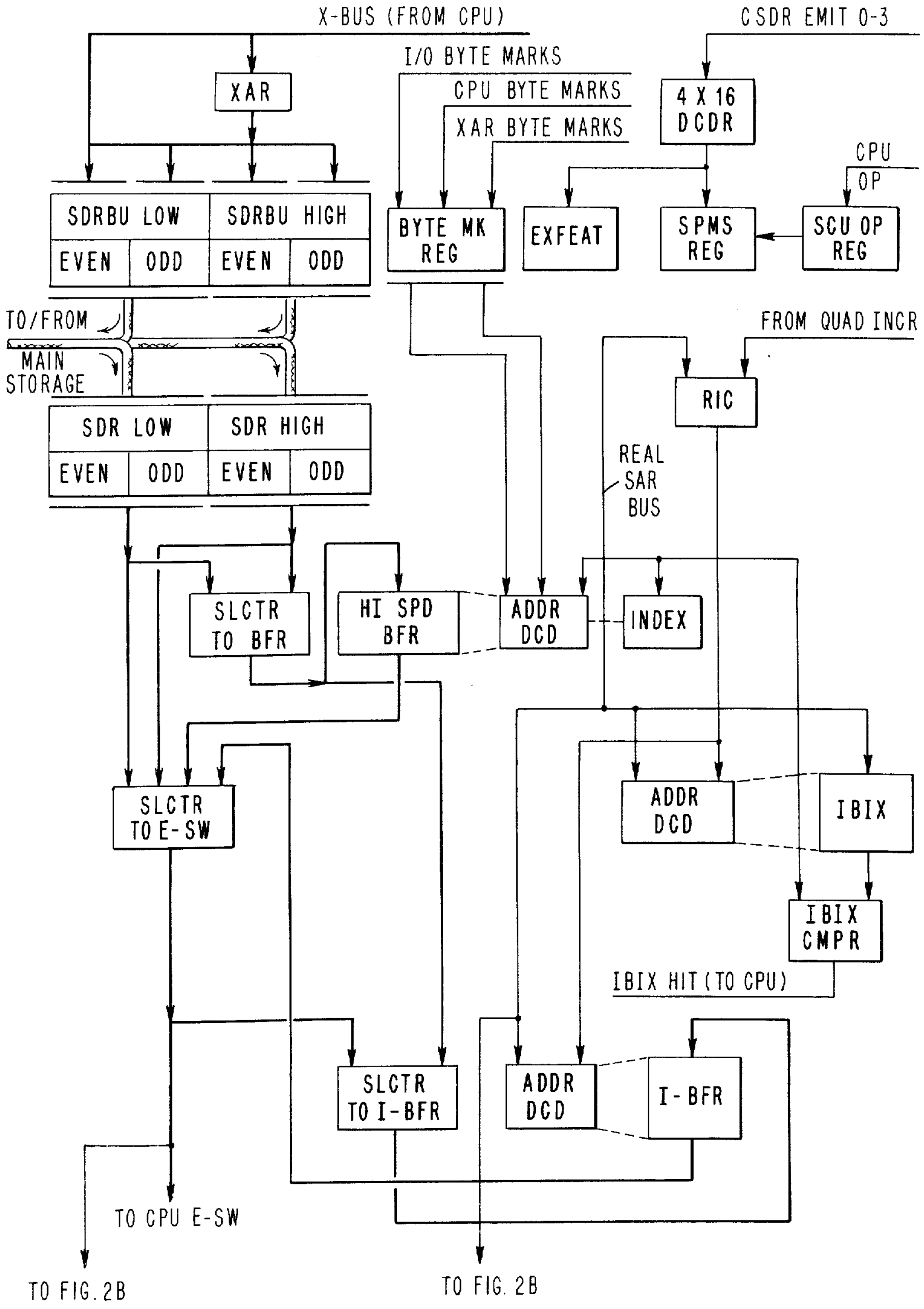
FIGS. 2A and 2B show, in block diagram form, addiional details of a storage control unit embodying the nvention.
Figure 2B:
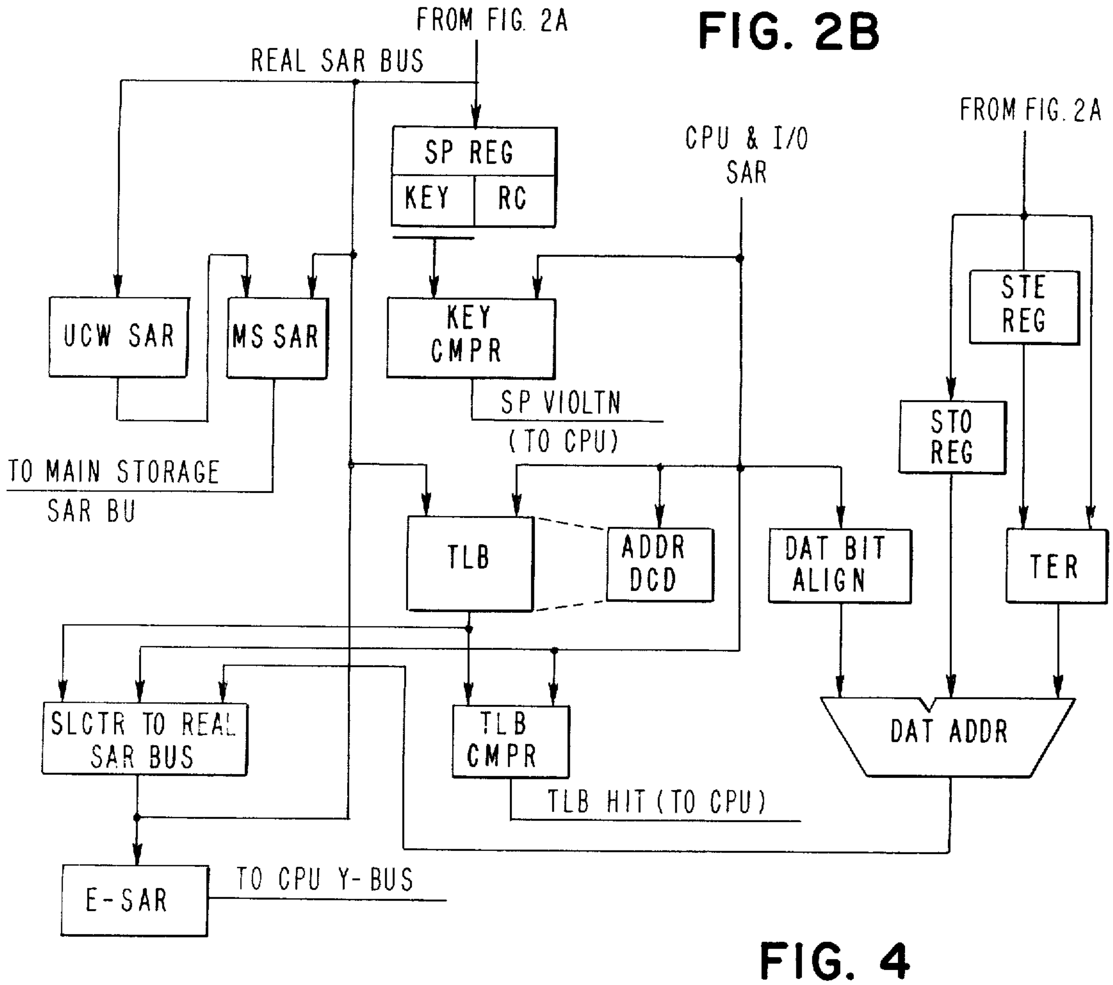

FIGS. 2A and 2B show a preferred implementation, [w]ithin the storage control unit (SCU), of the new I-[b]uffer and I-Buffer Index (IBIX) which are the most [i]mportant new hardware elements that have been [a]dded with this invention.

The SCU I-buffer and I-buffer index (IBIX) are used [t]o make instruction fetching more efficient. Experience [h]as shown that instructions are normally used in [b]locks. The I-buffer can hold a block of instructions [(]up to 64 words) that are being used or have been used [b]y the CPU while processing data. Because the instruc[ti]ons are immediately available from the I-buffer, I-[fe]tch efficiency is greatly increased.

As instructions are fetched from storage, they are placed in the SCU I-buffer. The SCU also fetches two instruction words beyond those needed for the three CPU IBs.

Adjuncts to the I-buffer are the I-buffer index and real instruction counter. The I-buffer index (IBIX) keeps track of the instructions in the I-buffer by storing the high-order real SAR bits of the instruction address. Bits used to address locations in IBIX (bits 24–27) and I-buffer (bits 24–28) come from the real instruction counter (RIC).

I-buffer and IBIX Control

The three units of the I-buffer circuits are: (1) RIC, (2) I-buffer index, and (3) I-buffer. Control of these units is in the SCU but these are only part of the total I-fetch control.

Figure 3:
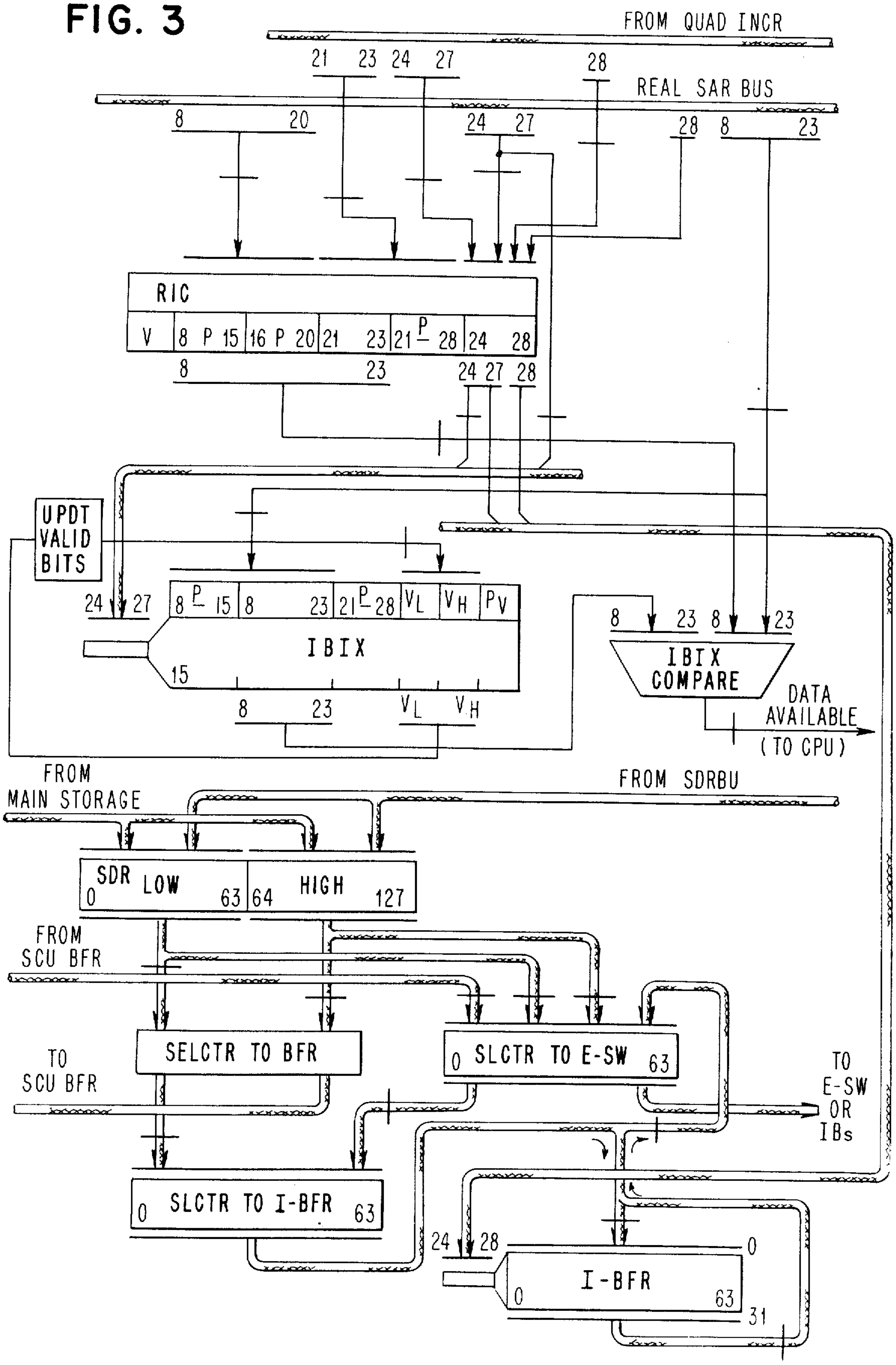
FIGS. 3A and 3B show details of the portions of the torage control unit of FIG. 2 which are most particuırly significant to the preferred implementation of the ıvention.

Additional details of these units and their interconnections are shown in FIG. 3 In the figure, the need for timing (or gating) signals at various points is implied by a short line perpendicular to the line (or bus) which carries the gated signal. Since details of the timing signals and their derivation are not essential for a complete understanding of the invention, they are not described herein. Such details may be found in the manuals referred to above, particularly in the first-referenced manual.

Real Instruction Counter (RIC) is a register that contains real SAR bits. These address bits are used by the other units of the I-buffer circuits. RIC contains real SAR bits 8–28 plus three parity bits. In addition, a RIC valid bit is set on when RIC contains usable address bits.

A FIB instruction sets real SAR bits 8–20 into RIC and turns on RIC valid. Bits 21–28 are from the quadword incrementer. "IFTN Clock" and "FIB" or "IFTN Clock" are pulses during IFTN time that lock out address bits 21–28 to RIC. At this time, RIC bits 24–28 are used to address I-buffer, and the quadword incrementer is updating to the next address.

During FIB, "Gate Real SAR" is active, gating real SAR bits 24–28 to RIC; during IFTN, "Gate RIC" is active, gating quadword incrementer bits to RIC after the data is gated from the I-buffer.

RIC bits 8–23 are used to compare with bits out of IBIX on an IFTN. RIC bits 24–27 address IBIX and 24–28 address I-buffer.

IBIX keeps track of the instructions in the I-buffer. FIB activates "Write IBIX" to store real SAR bits 8–23 of the instruction address. In addition, real SAR bit 28 causes valid high to be set on, or not real SAR bit 28 causes valid low to be set on if the FIB fetches the instruction from the SCU buffer. If the instruction is fetched from main storage, the whole quadword is set into I-buffer and both valid bits in IBIX are forced on.

The output of IBIX goes to compare circuits to determine if the desired instruction is in the I-buffer. IBIX bits 8–23 compare with bits 8–23 from real SAR during FIB or write, or from RIC during IFTN. Valid bits compare with RIC bit 28. During IFTN, if there is an equal comparison and RIC valid is on, "Data Available" becomes active to signal the CPU that the wanted instruction is in the I-buffer. An equal comparison of real SAR bits and IBIX bits blocks a FIB (not allow FIB) unless there are two CPU IBs empty at the time.

Valid Bit Update is required whenever Write IBIX is active for: (1) validate or degrade, (2) write operation with IBIX 8–23 compare, or (3) FIB. For (1) and (2) the valid bits are forced off. For (3), if the FIB is from main storage, both valid bits are forced on because a quadword is set into the I-buffer. If the FIB is from the SCU buffer, then the valid bit corresponding to bit 28 is set on. In the latter case, the other valid bit is regenerated if "IBIX 8–23 Compare" is active.

I-buffer holds up to 64 instruction words. Write I-buffer sets two words into the I-buffer. Write I-buffer is active for validate or degrade (used in machine check and system reset, respectively) and FIB. For FIB, Write I-buffer is active on cycle 2 when the instruction to be fetched is in the SCU buffer, or on cycles 8 and 9 when the instruction to be fetched is in main storage.

The I-buffer reads out at IFTN + 1 time on every IFTN whether there is an equal comparison or not. "Data Available" signals the CPU whether to use the instructions or not.

Parity Errors are checked in the I-buffer, in RIC, and IBIX. They are sampled only at IFTN time by "IFTN Gate".

Data Flow

Data flow to and from the I-buffer is on a bidirectional bus. Data (instructions) is gated from the I-buffer by "IFTN + 1 Slot" and gated to E-switch selector by "Gate I-buffer" (IFTN + 1 Slot powered).

Data flow (instructions) to the I-buffer is from the SCU buffer, from main storage, or from the SDR for a validate operation. From the SCU buffer, instructions are gated to E-switch selector by "Gate Buffer" and not Gate I-buffer. Then the instructions are gated to I-buffer selector to the bidirectional bus by not Gate I-buffer and not "Gate Backing Store". Write I-buffer sets the instructions into the I-buffer.

From main storage, instructions are fetched and set into the SDR. The instructions are gated from the SDR to buffer selector by "Gate High to Buffer" or not Gate High to Buffer, according to "Sar Bit 28". The instructions are then gated to I-buffer selector by not Gate I-buffer and Gate Backing Store. "Flip SAR 28" changes the state of Gate High to Buffer for the second doubleword. Write I-buffer is activated on two consecutive cycles to write the quadword into the I-buffer.

A validate operation writes SDR data into both the SCU buffer and the I-buffer. The path to the I-buffer is from the SDR to E-switch selector gated by not Gate Buffer, not Gate I-buffer, and High Gate to E-switch, according to SAR 28. The data is then gated to I-buffer selector by not Gate I-buffer and not Gate Backing Store.

On the bidirectional bus, the bit polarity changes depending upon the direction in which the data is going; "plus" on bit from SDR to I-buffer or to selected word bus, "minus" on bit from I-buffer to E-switch.

OPERATION

The primary operations affecting the I-buffer are FIB and IFTN. The FIB operation is activated by microcode in order to fetch instructions. There are two types of FIB operations possible: one fetches data from main storage and the other fetches data from the SCU buffer. Even though microcode calls for a FIB, the "Allow FIB" may prevent "FIB Select" to SCU if it is inactive and two IBs are not empty. An IBIX equal comparison and RIC valid on deactivate Allow FIB preventing FIB Select. In other words, the instructions desired are in the I-buffer and it is not necessary to FIB. FIB takes place, however, if two IBs are empty regardless of Allow FIB. A FIB is not cancelled, but may be delayed by holdoff cycles until storage is not busy from a previous operation.

A FIB from main storage proceeds as follows (data not in buffer):

1. FIB Select from CPU.
2. Check for address in TLB; go to step 4 if TLB hit.
3. Translate address if not in TLB.
4. When real SAR bits are available on bus, check SCU buffer index.
5. Gate 8–20 into RIC and write 8–23 into IBIX addressed by RIC bits 24–27.
6. Fetch data from main storage and set into SDR. Two words of instruction are available to CPU IBs.
7. On cycles 8 and 9, write quadword into I-buffer addressed by RIC bits 24–27 and 28; bit 28 is flipped (complemented) for the second cycle.
8. Write quadword into SCU buffer.

A FIB from SCU buffer is as follows (data in buffer):

1. FIB Select from CPU.
2. Check for address in TLB; go to step 4 if TLB hit.
3. Translate address if not in TLB.
4. Gate 8–20 into RIC and write 8–23 into IBIX addressed by RIC bits 24–27.
5. When real SAR bits are available on bus, check SCU buffer index.
6. Fetch doubleword from SCU buffer and gate to CPU IBs.
7. On cycle 2, write doubleword into I-buffer addressed by RIC bits 24–28.

The IFTN operation is a read from I-buffer to the CPU IBs. Data is gated out of the I-buffer to the CPU IBs on every IFTN by IFTN + 1 Slot. Whether the data is used or not is decided in the CPU. The I-buffer location is addressed using RIC bits 24–28. RIC bits 8-23 are compared with IBIX location bits 8–23. An equal comparison activates "Data Available" to the CPU signalling that the data at the CPU IBs is the desired instructions.

GENERAL DESCRIPTION OF THE INVENTION

Figure 4:
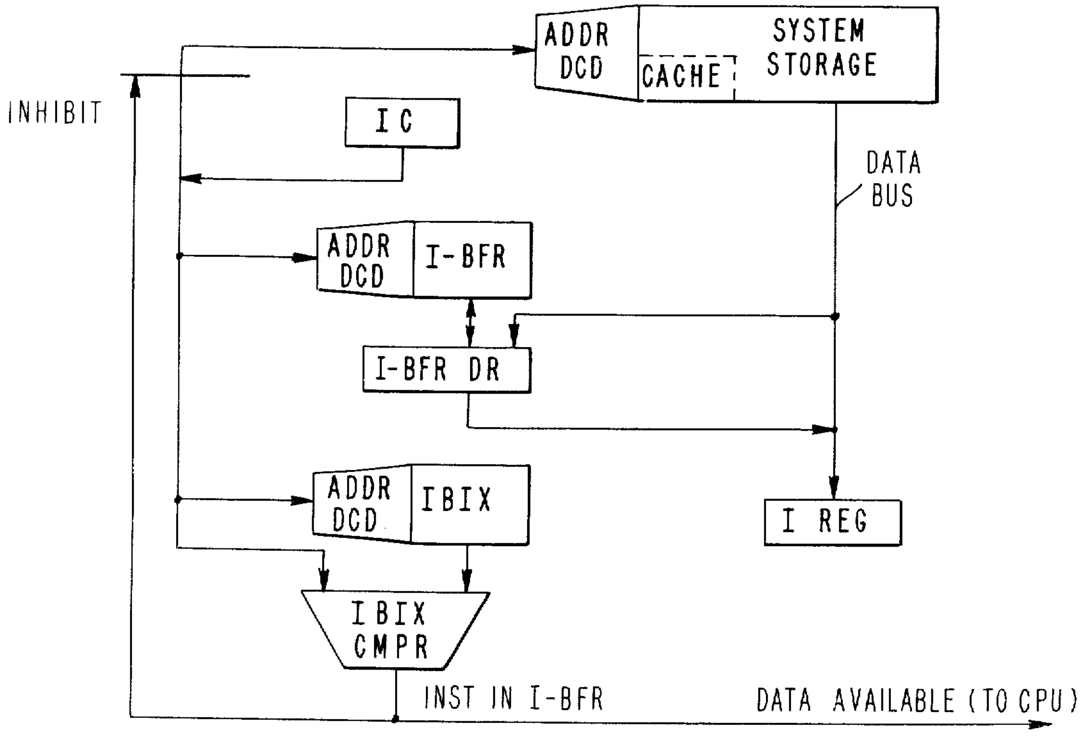
FIG. 4 is a generalized showing, again in block diaram form, of various elements of the invention and the ıanner in which they interact with certain other porıons of the overall system.

FIG. 4 presents a generalized showing of the invention as it might be implemented on substantially any given data processing system. The typical system will already contain a system storage (often buffered by a high-speed cache), an instruction counter IC for indicating the next instruction to be fetched, and an instruction register IREG into which instructions are fetched for execution. (In a preferred embodiment, there will also be look-ahead instruction buffers.) This invention adds an instruction buffer I-BFR with its associated data register I-BRF DR, a buffer index IBIX, and a comparator IBIX CMPR. (For the reasons described below, a separate I-BFR DR will not be required in some implementations.)

Assume that the IC contains the address of an instruction that is to be fetched to the CPU IREG. The contents of the IC will be gated to the I-buffer and to the IBIX, and a predetermined combination of the address bits from the IC will cause both the buffer and the index to read out a word. The word read from the I-buffer (into the I-BRF DR) will be available to the data bus which feeds the IREG. The word read from the IBIX, which contains sufficient address bits to identify the full address of the instruction that was read from the I-buffer, is transferred to the IBIX comparator where it will be compared with corresponding bits fed to the other side of the comparator from the IC. An equal comparison (preferably along with the presence ı the IBIX of appropriate "validity" bits as discussed ɔove) will result in the generation of a "data avail- ɔle" signal. This signal is utilized for two primary urposes: (1) the signal provides the CPU with an indi- ıtion that the instruction read from the I-buffer is the ɛsired next instruction; and (2) the signal is also used › inhibit an attempt to read the instruction from the ıain system storage.

In order to achieve maximum benefit from this inven- on, it is desirable that the IBIX read out and the IBIX ɔmparison be completed early enough in the machine ycle for the inhibit signal (assuming that the desired ıstruction is in the I-buffer) to prevent a reference to ıe system storage before it has actually begun. How- ver, in many data processing systems, the system stor- ge (including the high-speed cache, if there is one) is f such a nature that a storage reference can be aborted ithout wasting an entire memory cycle. This invention an be used to advantage in such systems even if a ıemory reference has begun before the inhibit signal is ɛnerated. Actually, the invention can provide substan- al performance advantages in any system where there a significant amount of contention for memory, be- ıuse instructions in the I-buffer are available even hen the system storage is occupied by attempts to ad or write operands. It should also be noted that ›ntention between different types of memory requests one reason that high-speed memories (often with 'en higher-speed caches) are being used with ever creasing frequency in modern data processing sys- ms. This invention, by reducing contention, can re- ıce the need for very high speed (and, usually, very pensive) memories in order to achieve maximum stem performance. The I-buffer can even be a slower emory than one or more of the units (for example, a gh-speed cache) that it is buffering, but of course it is eferable that the I-buffer be able to provide instruc- ›ns to the CPU at least as quickly as the CPU can ecute them. (If the I-BRF were implemented by a :vice whose speed was comparable to that of the stem store, the I-BFR DR could be dispensed with. ıe address provided by the IC would cause an instruc- ›n to be available from the I-BFR to be gated onto the ıta bus to the IREG, and instructions could be written to the I-BFR directly from the system storage data gister. When the I-BFR is a low-speed device, means ch as a separate I-BFR DR will generally be required order to temporarily hold data that is written into or ad from the I-BFR.)

As is also shown in FIG. 4, when an instruction is ad out from the system storage (because it was not ready present in the I-buffer) the instruction is trans- rred to the I-BFR (via the I-BFR DR, if there is one) well as being transferred to the IREG. When this vention is implemented on a system which has in- :uction look-ahead buffers (such as the IBs in the ıvironmental system described above) the I-BFR can, ıelf, be utilized as an additional level of instruction ok-ahead as well as being a part of the instruction ok behind apparatus. This additional level of look- ıead provided by the I-buffer (of course, if the system ›es not already have instruction buffers, the I-buffer ll be the only level of look-ahead) will further im- ove the performance of most data processing sys- ms.

Whenever additional hardware is added to any data ocessing system, one should consider the effects ›on the overall system of any malfunction in the new harware. (Generally, the probability that an error will occur somewhere in the system increases as the amount of hardware increases.) Another desirable feature of this invention is that most of the malfunctions which could possibly occur within the added hardware will merely have the effect of causing the overall system to operate as if the hardware had not been added. This is because most of the malfunctions which could occur would simply prevent generation of the "data available" signal and thus the CPU would not accept data from the I-buffer, nor would references to the system storage be inhibited.

While the invention has been particularly shown and described with reference to a preferred embodiment thereof, it will be understood by those skilled in the art that the above and other changes in form and details may be made therein without departing from the spirit and scope of the invention.

What is claimed is:

1. In a data processing system which includes a system storage, a processing unit, addressing means for addressing a location in said system storage which contains a desired instruction; improved means for transferring said desired instruction to said processing unit comprising:

instruction buffering means (I-buffer) comprising an auxiliary multi-word memory for storing only a plurality of instructions;

means interconnecting said system storage to said I-buffer for transmission of instructions from said system storage to said I-buffer;

means interconnecting said I-buffer to said processing unit for transmission of instructions from said I-buffer to said processing unit;

means interconnecting said addressing means to said I-buffer for addressing a specific location within said I-buffer that is at least partially defined by an address in said adressing means;

I-buffer indexing means (IBIX) comprising a multi-word memory for storing at least portions of each of a plurality of the system storage addresses of instructions contained in said I-buffer;

means interconnecting said addressing means to said IBIX for addressing a location within said IBIX that corresponds to said specific location within said I-buffer;

comparison means;

means interconnecting said IBIX to an input of said comparison means and means interconnecting said addressing means to another input of said comparison means for comparing address information read from said IBIX to address information contained in said addressing means;

said comparison means, upon detection of equality at said two inputs, causing generation of a data available signal which indicates that a desired instruction is contained within said I-buffer;

means within said system responsive to said data available signal to fetch said desired instruction to said processing unit from said I-buffer instead of from said system storage;

means responsive, after a comparison by said comparison means, to the absence of said data available signal to cause said desired instruction to be fetched from said system storage;

means responsive to said absence of said data available signal after said comparison for also causing said desired instruction to be stored into said I-buffer; and means responsive to said absence of said data available signal after said comparison for causing at least a portion of the system storage address of said desired instruction to be stored into said IBIX.

2. The improved apparatus of claim 1 wherein:

said I-buffer is of sufficient capacity to store n instructions; and said IBIX is of sufficient capacity to store n/m portions of addresses;

each portion of a system storage address stored in said IBIX being logically associated with m instruction addresses of said I-buffer.

3. The improved apparatus of claim 2 wherein m equals 2.

4. The improved apparatus of claim 2 wherein:

there is stored in said IBIX, along with each portion of a system storage address, one or more selectively settable validity indicators for identifying the one or ones of the m logically associated I-buffer addresses for which the entry in the IBIX is currently valid; and wherein said improved apparatus additionally comprises means responsive to said validity indicators for allowing generation of said data available signal only when an appropriate validity indicator is set.

* * * * *